May 25, 1943. E. H. LAND 2,319,816
LIGHT POLARIZER AND PROCESS OF MANUFACTURE
Filed Oct. 29, 1938
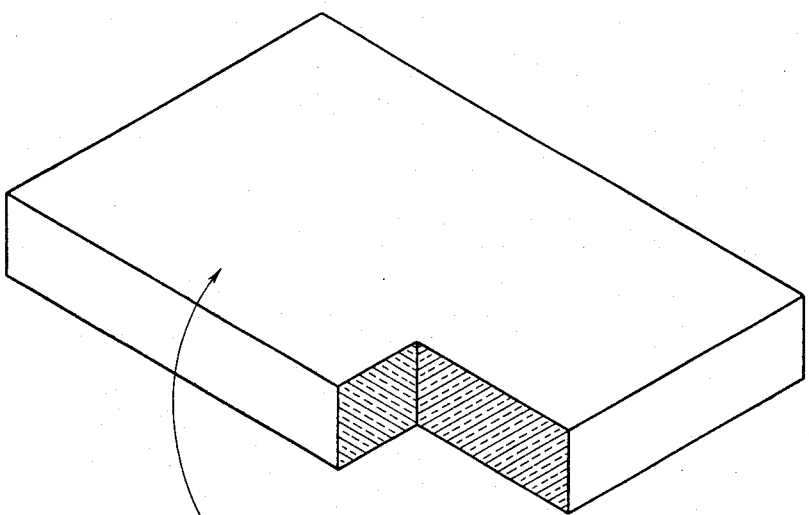
Dichroic Glass
INVENTOR.
Edwin H. Land
BY Brown & Jones Patented May 25, 1943

2,319,816

UNITED STATES PATENT OFFICE 2,319,816

LIGHT POLARIZER AND PROCESS OF MANUFACTURE

Edwin H. Land, Boston, Mass., assignor to Polaroid Corporation, Dover, Del., a corporation of Delaware Application October 29, 1938, Serial No. 237,782

18 Claims. (Cl. 88—65)

This invention relates to a light-polarizing dichroic glass and to a method of manufacturing the same.

An object of the invention is to provide a glass containing a substance which renders the glass dichroic throughout a predetermined wave length band.

A still further object of the invention is to provide such a glass which is dichroic throughout substantially the entire visible spectrum.

A further object of the invention is to provide such a dichroic glass which contains a metal.

A still further object of the invention is to provide a process for the manufacture of dichroic glass comprising incorporating a metallic compound with glass, reducing the metallic compound substantially to a metal, and heating and stretching the glass under such conditions as to impart dichroism thereto.

A still further object is to provide a process comprising incorporating a metal with glass and stretching the glass to render it dichroic while maintaining the metal therein.

Other objects of the invention will in part be obvious and will in part appear hereinafter.

The invention accordingly comprises the several steps and the relation of one or more of such steps with respect to each of the others, and the article possessing the features, properties, and the relation of elements which are exemplified in the following detailed disclosure, and the scope of the application of which will be indicated in the claims.

For a fuller understanding of the invention, reference should be had to the accompanying drawing which represents diagrammatically a perspective view, partly in section, of a portion of a sheet of light-polarizing material embodying a form of the invention.

I have found that if a glass containing a reducible metallic compound, such for example as a metallic oxide, is subjected to a treatment, for example a heat treatment, which reduces some or all of the metallic compound present to a metal, and if the glass is then stretched, preferably while at a dull red heat, it becomes, when cool, dichroic and, depending upon the metal present in the glass, polarizes a transmitted beam of light within predetermined wave length bands. The term "dichroic" as used in the specification and claims is intended to describe the property of differential absorption of the components of an incident beam of light depending upon the direction of vibration of those components. In certain instances the dichroism may extend substantially throughout the visible spectrum. Under these circumstances the dichroic glass of the present invention is substantially opaque to visible light vibrating in a predetermined direction and transparent to visible light vibrating at right angles to that direction. In other cases the dichroism of the glass of the present invention may extend throughout only a narrow band of wave lengths in the visible spectrum. Under these circumstances certain wave lengths of an incident beam of light vibrating in one direction are absorbed wholly or substantially, whereas the same wave lengths of light vibrating at right angles to the first-mentioned direction are not so greatly absorbed. Hence the color of the component vibrating in the first direction transmitted by the dichroic glass of the present invention will be different from the component vibrating in the direction at right angles thereto. In the latter case the glass may show one color when viewed through a polarizing analyzer and a different color when the analyzer is rotated through an angle of 90°. The term "dichroic" as here employed is to be construed generically and in the same sense in which the term is employed in connection with crystals. Under certain circumstances, as for example where the glass contains lead, the dichroism shown by the finished product is a light gray or neutral, colorless tint when the glass is viewed in polarized light vibrating in a predetermined direction and dark gray or substantially opaque when the glass is viewed in polarized light vibrating at right angles to the first-mentioned direction, i. e., the glass polarizes throughout substantially all of the visible spectrum. Under other circumstances, for example where the glass contains gold, the dichroism obtained is from a pinkish red when the glass is viewed in polarized light vibrating in a predetermined direction to a deep ruby red when the glass is viewed in polarized light vibrating at right angles to said first-mentioned direction, the product being a polarizer throughout only a limited wave length band in the visible spectrum.

In a preferred embodiment of the invention a glass is made in the usual containing a reducible metallic compound, for example lead oxide or other metallic oxides. Glass of this type is now readily available. The metallic compound may be distributed throughout the glass or it may be distributed throughout the surface layers only thereof.

Such a glass is subjected to a heat treatment in a reducing atmosphere, for example an atmosphere of hydrogen, or in air, until the reducible metallic compound therein, or a substantial portion thereof, has been converted into the metal. For example, where the glass contains lead oxide, it may be subjected to a hot flame in air and the oxide, in areas of the glass adjacent the surface of the glass at least, readily converted to metallic lead. It will be apparent that by the use of reducing atmospheres such as atmospheres of hydrogen, more complete reduction may be obtained. It will also be apparent that the heated glass may be folded back upon itself and stretched and kneaded so as to uncover portions thereof containing the reducible metallic compound and subject them to the reducing conditions. Where the glass consists, in large part, of the oxide of the metal to be reduced, it is necessary that only a small proportion of the oxide be reduced to the metal. Satisfactory results have been obtained where only portions of the glass adjacent the surfaces thereof have been subjected to a reducing process.

When a desired amount of the reducible metallic compound within the glass has been converted to the metal, the glass may be brought to a temperature at which it may be stretched or extended but at which it does not readily flow. It is desirable that the stretch be accomplished at, for example, dull red heat. The glass should preferably be extended under conditions such that substantially uniform stress is imparted throughout all cross-sectional areas. Under these circumstances dichroic glass has been produced, the degree and character of dichroism depending upon the metal within the glass, the quantity thereof which has been reduced, the stretch to which the glass has been subjected, and the temperature at which the stretch has taken place. If, for example, the glass has been stretched at too high a temperature, say while it is bright red or cherry red, the resulting product frequently shows little or no dichroism.

In certain cases the metal may be introduced directly into glass and the glass may be heated and stretched to render it dichroic while maintaining the metal constantly in the metallic state. Ruby glass, or glass containing gold, is an example of a suitable material for use in such a modification of the invention.

Satisfactory results have been obtained by using various metallic compounds. The product obtained from a glass containing lead oxide which has been subjected to the reducing process and then stretched while at a suitable temperature, is a dichroic glass polarizing effectively substantially throughout the entire visible spectrum. The products obtained from other metals have varying dichroism. The glass containing gold, known generally as ruby glass, when subjected to the process outlined above shows distinct dichroism between a pale red and a much deeper ruby red. Similarly, other metals give dichroism throughout other wave length bands.

So also, glass containing a metal may be rendered dichroic by other forms of distortion, as for example by compression.

The product of the present invention possesses great utility. It is cheap. It may be used in exposed positions without protection. It is rigid, self-supporting, and durable. It need not be laminated. It may be ground and polished and formed into lenses without destruction of its polarizing properties. It is unaffected by exposure to moisture, ultra-violet radiation or other media which adversely affect unprotected synthetic polarizers. It can be produced in large areas, and as previously indicated, throughout a wide range of colors.

Since certain changes in carrying out the above process, and certain modifications in the article which embody the invention may be made without departing from its scope, it is intended that all matter contained in the above description or shown in the accompanying drawing shall be interpreted as illustrative and not in a limiting sense.

It is also to be understood that the following claims are intended to cover all the generic and specific features of the invention herein described, and all statements of the scope of the invention which, as a matter of language, might be said to fall therebetween.

Having described my invention, what I claim as new and desire to secure by Letters Patent is:

1. A process comprising forming glass containing a reducible metallic compound, reducing a predetermined portion of the compound in the glass to the metallic state, and stretching the glass at a temperature below the melting temperature of the glass to render the glass dichroic.

2. A process comprising forming glass containing a reducible metallic compound, reducing a predetermined portion of the compound in the glass to the metallic state, and deforming the glass at a temperature below the melting temperature of the glass to render the glass dichroic.

3. A process comprising forming glass containing a reducible metallic compound, reducing a predetermined portion of the compound in the glass to the metallic state, and stretching the glass while maintaining the glass at a dull red heat, to render the glass dichroic.

4. The process of forming dichroic glass from glass containing a metallic oxide which comprises reducing a predetermined amount of the oxide to the metallic state and stretching the glass at a temperature below the melting temperature of the glass to render it dichroic.

5. The process of forming dichroic glass from glass containing a metallic oxide which comprises reducing a predetermined amount of the oxide to the metallic state and deforming the glass at a temperature below the melting temperature of the glass to render it dichroic.

6. The process comprising forming dichroic glass from glass containing a reducible metallic compound which comprises heating the glass in a reducing atmosphere to convert a predetermined quantity of said compound to the metallic state, and stretching the glass while maintaining it at approximately dull red heat, to render the glass dichroic.

7. The process comprising forming dichroic glass containing lead from glass containing lead oxide by reducing some of the lead oxide to metallic lead, and stretching the glass while it is substantially at dull red heat, to render the glass dichroic.

8. The process comprising introducing a metal into glass, cooling said glass to hardness, heating the glass to substantially dull red heat, and stretching the glass while heated to render it dichroic.

9. The process of forming a light polarizer comprising forming a glass containing a metal and rendering said glass light-polarizing and dichroic by stretching the glass while it is heated to substantially dull red heat.

10. The process of forming a light polarizer comprising forming glass containing a metal and rendering said glass light-polarizing and dichroic by stretching the glass while it is heated to a temperature at which it is stretchable but below the melting temperature of the glass.

11. The process of forming a light polarizer comprising forming a glass containing a metal and rendering said glass light-polarizing and dichroic by deforming the glass while it is heated to a temperature at which it is stretchable but below the melting temperature of the glass.

12. A light-polarizing element which differentially absorbs two perpendicular components of an incident beam of light throughout a predetermined wavelength band and which comprises glass having a metallic content, the glass with its metallic content having been extended under stress and at a temperature at which it is stretchable but below its melting point, the polarizing properties of the element deriving essentially from the metallic content of the glass.

13. A light-polarizing element which differentially absorbs two perpendicular components of an incident beam of light throughout a predetermined wavelength band and which comprises glass containing a metal and a reducible metallic compound, the glass with its metallic content having been extended under stress and at a temperature at which it is stretchable but below its melting point, the polarizing properties of the element deriving essentially from the metallic content of the glass.

14. A light-polarizing element which differentially absorbs two perpendicular components of an incident beam of light throughout a predetermined wavelength band and which comprises glass containing a metal and an oxide of the metal, the glass with its metallic content having been extended under stress and at a temperature at which it is stretchable but below its melting point, the polarizing properties of the element deriving essentially from the metallic content of the glass.

15. A light-polarizing element which differentially absorbs two perpendicular components of an incident beam of light throughout a predetermined wavelength band and which comprises glass containing lead, the glass with its metallic content having been extended under stress and at a temperature at which it is stretchable but below its melting point, the polarizing properties of the element deriving essentially from the metallic content of the glass.

16. A light-polarizing element which differentially absorbs two perpendicular components of an incident beam of light throughout substantially the entire visible spectrum and which comprises glass having a metallic content, the glass with its metallic content having been extended under stress and at a temperature at which it is stretchable but below its melting point, the polarizing properties of the element deriving essentially from the metallic content of the glass.

17. A light-polarizing element which differentially absorbs two perpendicular components of an incident beam of light throughout a predetermined wavelength band and which comprises glass containing gold, the glass with its metallic content having been extended under stress and at a temperature at which it is stretchable but below its melting point, the polarizing properties of the element deriving essentially from the metallic content of the glass.

18. A light-polarizing element which differentially absorbs two perpendicular components of an incident beam of light throughout a predetermined wavelength band and which comprises glass having a metallic content adjacent at least one of its surfaces, the glass with its metallic content having been extended under stress and at a temperature at which it is stretchable but below its melting point, the polarizing properties of the element deriving essentially from the metallic content of the glass.

EDWIN H. LAND.

CERTIFICATE OF CORRECTION.

Patent No. 2,319,816.  May 25, 1943.

EDWIN H. LAND.

It is hereby certified that error appears in the printed specification of the above numbered patent requiring correction as follows: Page 1, second column, line 47, after "usual" insert --manner--; page 2, first column, line 5, for "fllame" read --flame--; and second column, line 48, claim 6, for "comprising" read --of--; line 73, claim 10, before the word "glass" insert --a--; and that the said Letters Patent should be read with this correction therein that the same may conform to the record of the case in the Patent Office.

Signed and sealed this 21st day of December, A. D. 1943.

(Seal)
Henry Van Arsdale,
Acting Commissioner of Patents.